US010991180B2

(12) United States Patent
Grenier et al.

(10) Patent No.: US 10,991,180 B2
(45) Date of Patent: Apr. 27, 2021

(54) CONTROLLER AREA NETWORK (CAN) MESSAGE SCANNER FOR A WINTER SERVICE VEHICLE, AND METHOD OF SCANNING A CAN MESSAGE

(71) Applicant: ENGRENAGE PROVINCIAL INC., Québec (CA)

(72) Inventors: Martin Grenier, Québec (CA); Mathieu Jobin, Quebec (CA)

(*) Notice: Subject to any disclaimer, the term of this patent is extended or adjusted under 35 U.S.C. 154(b) by 0 days.

(21) Appl. No.: 16/808,837

(22) Filed: Mar. 4, 2020

(65) Prior Publication Data

US 2020/0202641 A1 Jun. 25, 2020

Related U.S. Application Data

(63) Continuation-in-part of application No. 15/873,338, filed on Jan. 17, 2018, now abandoned.

(Continued)

(51) Int. Cl.
  *G07C 5/08* (2006.01)
  *G07C 5/00* (2006.01)
  *B60W 50/00* (2006.01)
  *H04L 12/40* (2006.01)

(52) U.S. Cl.
  CPC ............ *G07C 5/085* (2013.01); *B60W 50/00* (2013.01); *G07C 5/008* (2013.01); *G07C 5/0808* (2013.01);
  (Continued)

(58) Field of Classification Search
  CPC ........ B60R 16/023; B60W 2050/0045; B60W 50/00; E01C 19/201; E01C 19/203;
  (Continued)

(56) References Cited

U.S. PATENT DOCUMENTS 5,318,226 A * 6/1994 Kime ................... E01H 10/007
                                                        239/1
5,569,848 A    10/1996 Sharp
(Continued)

FOREIGN PATENT DOCUMENTS

EP         2180099 B1      4/2010

OTHER PUBLICATIONS

Salt Institute "Salt & Highway Deicing / Summer", available at www.saltinstitute.org, 2009.
(Continued)

*Primary Examiner* — Christopher Biagini
(74) *Attorney, Agent, or Firm* — Norton Rose Fulbright Canada LLP; Reno Lessard (57) ABSTRACT

There is described a controller area network (CAN) message scanner for a winter service vehicle. The CAN message scanner generally has a housing; a controller inside said housing; and a CAN bus link having a proximal end connected to said controller and a distal end connected to a diagnostic port of an engine control unit (ECU) of said winter service vehicle; said controller performing, while said winter service vehicle has a given speed, receiving a CAN message from said ECU vehicle via said CAN bus link, said CAN message having vehicle data fields located at corresponding addresses of said CAN message; retrieving a vehicle data field having a value matching a speed value indicative of said given speed of said winter service vehicle; and generating a signal indicating an address corresponding to said retrieved vehicle data field.

16 Claims, 7 Drawing Sheets

Related U.S. Application Data (60) Provisional application No. 62/488,321, filed on Apr. 21, 2017.

(52) U.S. Cl.
CPC ............... *H04L 12/40013* (2013.01); *B60W 2050/0045* (2013.01); *H04L 2012/40215* (2013.01); *H04L 2012/40273* (2013.01)

(58) Field of Classification Search
CPC ..... E01C 2019/2075; E01C 2019/2095; E01H 10/007; F02D 2400/11; G01R 31/007; G05B 15/02; G05D 7/0605; G07C 2205/02; G07C 5/008; G07C 5/08; G07C 5/0808; G07C 5/085; H04L 12/40; H04L 12/40013; H04L 2012/40215; H04L 2012/40273; H04L 67/12
See application file for complete search history.

(56) References Cited

U.S. PATENT DOCUMENTS

| | | | |
|---|---|---|---|
| 5,693,876 A | 12/1997 | Ghitea, Jr. et al. | |
| 2004/0215379 A1* | 10/2004 | Pangerl | G01L 3/26 701/31.4 |
| 2005/0189432 A1 | 9/2005 | Kime | |
| 2006/0170168 A1* | 8/2006 | Rotz | B62D 61/12 280/5.501 |
| 2008/0255888 A1 | 10/2008 | Berkobin et al. | |
| 2009/0234534 A1* | 9/2009 | Stempnik | B60W 50/0205 701/30.7 |
| 2015/0123374 A1* | 5/2015 | Smith | B60R 3/002 280/166 |
| 2017/0048241 A1 | 2/2017 | Tanabe et al. | |

OTHER PUBLICATIONS

Hard Working Trucks "GPS Salt Spreader Speed Controller" available at www.hardworkingtrucks.com, 2005.
Circus Control "Precision Controls for Powerful Spreader Performance" available at www. airuscontrols.com, 2011.
Bosch "Compu-Spread CS-550 Solids & Liquids Spreader Controller" available at https://dc-caresource.bosch.com/media/ca/industries_4/mobile_applications_16/on_highway_and_commercial_vehicles_/compu_spread_for_snow___ice_industry_/technical_documents_/documents_413/cs_datasheet_550_10-2016.pdf.
Instrument Associates "Salt and Sand Truck Hydraulics Innovative Products and System Solutionshttp" available at www.instrumentassociates.com, Jan. 2017.

* cited by examiner

CONTROLLER AREA NETWORK (CAN) MESSAGE SCANNER FOR A WINTER SERVICE VEHICLE, AND METHOD OF SCANNING A CAN MESSAGE

FIELD

The improvements generally relate to winter service vehicles and more specifically to winter service vehicles including spreading systems for spreading de-icing material such as salt, sand and/or the like on the roads during winter for de-icing purposes.

BACKGROUND

Winter service vehicles are generally used to remove snow and ice from the roads during winter. A typical winter service vehicle includes a spreading system for receiving, carrying and spreading the de-icing material on the roads.

It is known to vary a spreading rate at which the de-icing material is spread on the roads as a function of a speed of the winter service vehicle. Indeed, for a same amount of de-icing material to be spread on a given length of road, a winter service vehicle traveling at a higher speed will need to spread the de-icing material at a spreading rate greater than a spreading rate of a winter service vehicle traveling at a lower speed.

Knowing the speed of the winter service vehicle with accuracy helps determining a satisfactory spreading rate. As can be understood, under spreading may lead to inadequate de-icing while over spreading may lead to unnecessary material costs.

Conventional ways to determine the speed of the winter service vehicle typically involve the use of an optical speed sensor pointed at the road or the use of a global positioning system (GPS) sensor. Although the conventional winter service vehicles are satisfactory to a certain extent, dirt obstructing a field of view of the optical speed sensor or GPS drifts associated with GPS sensors can limit the accuracy of the measurement of the speed of the winter service vehicle and, in turn, limit the accuracy of the spreading rate. There thus remains room for improvement.

SUMMARY

This disclosure relates to determining the speed of the winter service vehicle from an engine control unit (ECU) of the winter service vehicle via a controller area network (CAN) bus connection. Such CAN bus connection can be established by connecting a CAN bus link to a diagnostic CAN bus port of the ECU. Proceeding accordingly was found satisfactory as the speed of the winter service vehicle can be determined in an accurate and systematic manner, even in difficult weather conditions.

In accordance with one aspect, there is provided a winter service vehicle having a chassis, an engine mounted to the chassis, an ECU, a spreading system mounted to the chassis, and a computer, the winter service vehicle further comprising: a CAN bus link connected between the ECU and the computer; the computer being configured to: determining a current speed of the winter service vehicle via the CAN bus link; and determining a spreading rate of the spreading system based on the current speed of the winter service vehicle, the spreading rate being the rate at which de-icing material is spread on roads by the spreading system.

In accordance with another aspect, there is provided a computer-implemented method for determining a spreading rate at which de-icing material is spread on roads by a winter service vehicle having a chassis, an engine mounted to the chassis, an ECU, a spreading system mounted to the chassis, and a computer, the method comprising: establishing a CAN bus connection between the ECU and the computer; determining a current speed of the winter service vehicle using the CAN bus connection; and determining the spreading rate based on the current speed of the winter service vehicle.

In accordance with another aspect, there is provided a method for determining a spreading rate at which de-icing material is spread on roads by a winter service vehicle having a chassis, an engine mounted to the chassis, an ECU, a spreading system mounted to the chassis, and a computer, the method comprising: connecting a CAN bus link between the ECU and the computer; using the computer, determining a current speed of the winter service vehicle using the CAN bus link; and determining the spreading rate based on the current speed of the winter service vehicle; and spreading de-icing material on roads at the determined spreading rate using the spreading system.

It was found that installation of such a spreading system may be challenging, especially as the implementation of CAN communication generally differs from one engine type or make to another. For instance, some information communicated via CAN messages, e.g., the current speed of the winter service vehicle, may have a first CAN message address for a given engine type or make but a second, different CAN message address for another engine type or make. Accordingly, existing protocols for installing the spreading system were found to be cumbersome and/or inefficient as they required highly trained technicians, discussions with the engine manufacturer(s) and/or operation/maintenance manual(s) scrutiny. There thus remained room for improvement.

In accordance with another aspect, there is provided a CAN message scanner which can alleviate at least some of the above-mentioned drawbacks. The CAN message scanner is connectable to the ECU of any engine type or make via a CAN bus link. More specifically, the CAN message scanner is operable to, while moving the winter service vehicle at a given speed, receive a CAN message from the ECU of the moving winter service vehicle. While the winter service vehicle is still moving, or at a complete stop, the CAN message scanner can then automatically scan values carried by each and every vehicle data fields of the received CAN message. When one of the scanned values matches with the given speed of the winter service vehicle, the CAN message scanner can thereby retrieve the address(es) associated with the corresponding vehicle data field(s), and generate a signal indicative of the retrieved address(es), an information which can be highly valuable in satisfactorily and efficiently installing a spreading system to any winter service vehicle.

In accordance with another aspect, there is provided a CAN message scanner for a winter service vehicle, the CAN message scanner comprising: a housing; a controller inside said housing; and a CAN bus link having a proximal end connected to said controller and a distal end connected to a diagnostic port of an ECU of said winter service vehicle; said controller having a processor and a memory having instructions stored thereon which when executed by said processor perform, while said winter service vehicle has a given speed, receiving a CAN message from said ECU vehicle via said CAN bus link, said CAN message having a plurality of vehicle data fields located at corresponding addresses of said CAN message; retrieving at least a vehicle data field having a value matching a speed value indicative of said given speed of said winter service vehicle; and generating a signal indicating at least an address corresponding to said retrieved vehicle data field.

In accordance with another aspect, there is provided a method of scanning a CAN message received from a winter service vehicle, said method comprising: communicatively connecting a controller to an ECU of said winter service vehicle via a CAN bus link; said controller performing the steps of: while said winter service vehicle moves at a given speed, receiving a CAN message from said ECU via said CAN bus link, said CAN message having a plurality of vehicle data fields located at corresponding addresses of said CAN message; retrieving at least a vehicle data field having a value matching a speed value indicative of said given speed of said winter service vehicle; and generating a signal indicating at least an address corresponding to said retrieved vehicle data field.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
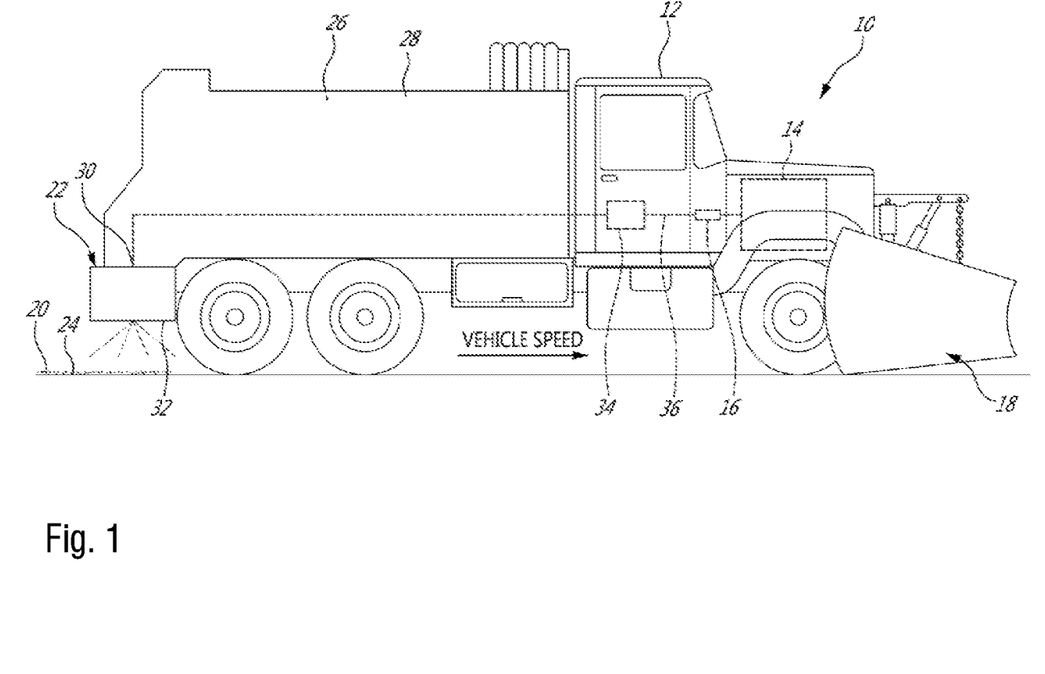
FIG. 1 is a side elevation view of an example of winter service vehicle, in accordance with an embodiment.

FIG. 1 shows an example of a winter service vehicle 10. In this example, the winter service vehicle 10 has a truck chassis 12. In some embodiments, the truck chassis 12 can be a dump truck chassis.

As shown, the winter service vehicle 10 has an engine 14 mounted to the truck chassis 12. More specifically, in this embodiment, the engine 14 is a diesel engine which can power the winter service vehicle 10 in a manner allowing the winter service vehicle 10 to accelerate to and maintain a given speed during use. The winter service vehicle 10 has an engine control unit (ECU) 16 or engine control module (ECM) which is in communication with the engine 14 for controlling one or more of its electrical systems or subsystems to ensure optimal performance of the engine 14.

In this example, the winter service vehicle 10 has a snow removal equipment or a snowplow 18 mounted in a front portion of the truck chassis 12. In this way, the winter service vehicle 10 can be used for removing snow and ice from outdoor surfaces such as road 20.

The winter service vehicle 10 has a spreading system 22 mounted to the truck chassis 12. The spreading system 22 is used for receiving, carrying and spreading de-icing material 24 on the road 20 for de-icing purposes. The de-icing material 24 can be provided in the form of particulate material, liquid material, or a combination of both. Examples of de-icing material 24 commonly used for de-icing road 20 includes salt (e.g., rock salt), sand and/or gravel. However, any type of de-icing material 24 can be used including calcium chloride, magnesium chloride, potassium chloride, calcium magnesium acetate, potassium formate, sodium formate, calcium formate and/or urea.

In this embodiment, the spreading system 22 includes a hopper 26 with an upwardly facing end 28 for receiving the de-icing material 24 and a downwardly facing discharging end 30 for discharging the de-icing material 24 as desired.

As shown, the discharging end 30 of the truck chassis 12 is located at a rear portion of the truck chassis 12. In this specific embodiment, the spreading system 22 has an impeller 32 provided at the discharging end 30 for spreading the de-icing material 24 on the road 20 in a manner allowing to control a rate at which the de-icing material 24 is spread on the road 20, i.e. the spreading rate. In some embodiment, a rotation speed of the impeller 32 is increased when the spreading rate of the de-icing material 24 is to be increased.

The winter service vehicle 10 has a computer 34 which is communicatively coupled to the spreading system 22. The computer 34 is adapted and configured to control the spreading rate of the spreading system 22. For instance, the computer 34 can transmit instructions to the spreading system 22 which can increase, maintain or decrease a current spreading rate of the spreading system 22.

The winter service vehicle 10 has a controller area network (CAN) bus link 36 which is connected between the ECU 16 and the computer 34 so as to establish a CAN bus connection between the ECU 16 and the computer 34. In this way, the computer 34 can determine a current speed of the winter service vehicle 10 via the CAN bus link 36 and then determine the spreading rate based on the previously determined current speed of the winter service vehicle 10. Accordingly, the spreading system 22 can spread the de-icing material 24 on the road 20 at the determined spreading rate.

As can be understood, in this embodiment, the CAN bus link 36 allows communication according to the SAE J1939 standard protocol maintained by SAE International. However, in some other embodiments, it is envisaged that the CAN bus link 36 can allow communication according to any type of communication protocol of the ECU, including for instance the SAE J1708 standard protocol maintained by SAE International and/or the CANopen protocol.

Figure 2:
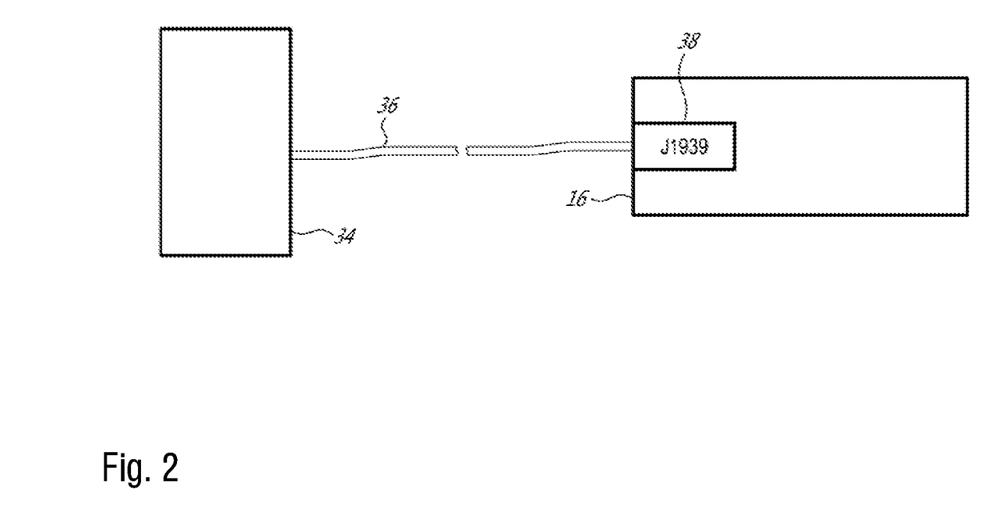
FIG. 2 is an enlarged partial view of an ECU of the winter service vehicle of FIG. 1, showing a CAN bus link connected to a diagnostic CAN bus port of the ECU, in accordance with an embodiment.

As best seen in the embodiment of FIG. 2, the CAN bus link 36 includes a wired connection between a diagnostic CAN bus port 38 of the ECU 16 and the computer 34. In this specific embodiment, the engine 14 is a diesel engine so the diagnostic CAN bus port 38 is a J1939 port.

In some embodiments, the computer 34 is configured to perform the step of determining the current speed of the winter service vehicle 10 and the step of determining the spreading rate based on the most previously determined current speed of the winter service vehicle 10 in a repeated manner to ensure that an ideal spreading rate is used at all times during operation of the winter service vehicle 10. For instance, these steps of determining can be repeated at a frequency higher than 10 Hz, preferably higher than 100 Hz, and most preferably higher than 500 Hz.

The CAN bus link 36 allows communication of messages or frames between the ECU 16 and the computer 34. In some embodiments, the computer 34 receives a CAN bus signal comprising a series of frames and can retrieve the current speed of the winter service vehicle 10 from one or more of the frames of the CAN bus signal.

A CAN bus signal can have one of four frame types: i) a data frame containing data for transmission, ii) a remote frame requesting the transmission of a specific identifier, iii) an error frame transmitted indicating an error, iv) an overload frame injecting a delay between data and/or remote frames.

In some embodiments, the ECU 16 can transmit frames on an autonomous basis so that the computer 34 can receive a data frame concerning the current speed of the winter service vehicle 10 periodically. In some other embodiments, the computer 34 is configured to transmit a remote frame requesting the transmission of a specific identifier concerning the current speed of the winter service vehicle 10. In these embodiments, the computer 34 receives the data frame concerning the current speed of the winter service vehicle 10 shortly after the remote frame is transmitted.

The frame can have differing types of standardized formats. For instance, the frame format can be a standard frame format as described in CAN 2.0 A and/or CAN 2.0 B or can alternatively be the extended frame format as described in CAN 2.0 B. One difference between the two formats is that the "CAN base frame" supports a length of 11 bits for the identifier, and the "CAN extended frame" supports a length of 29 bits for the identifier, made up of the 11-bit identifier ("base identifier") and an 18-bit extension ("identifier extension"). A distinction between CAN base frame format and CAN extended frame format can be made by using the IDE bit, which is transmitted as dominant in case of an 11-bit frame, and transmitted as recessive in case of a 29-bit frame. The computer 34 can be configured to support any of the standard frame formats and/or the extended frame format.

Figure 3:
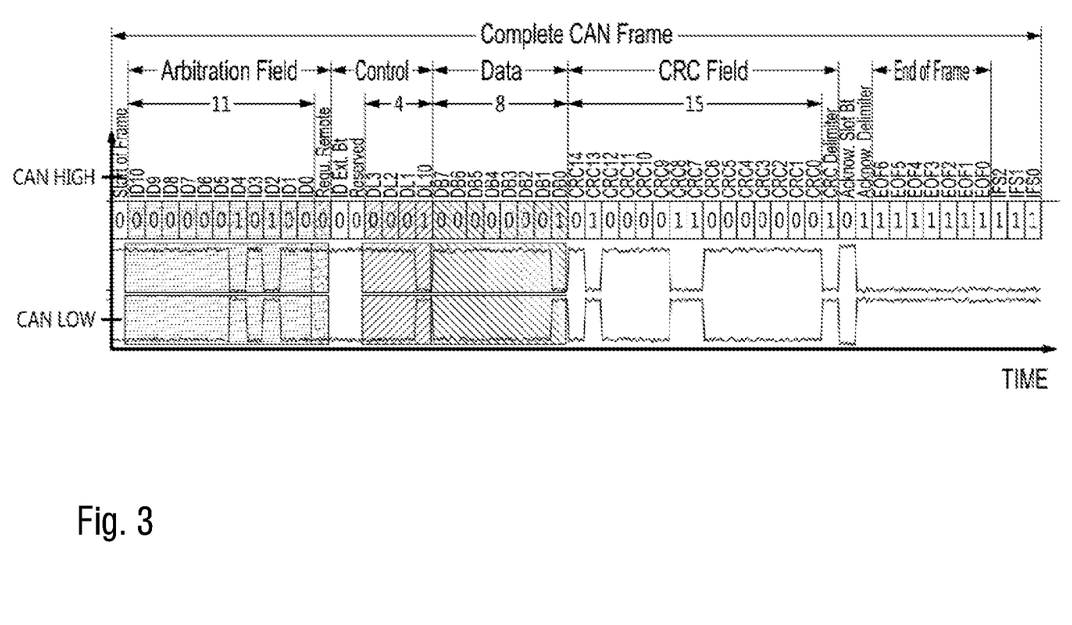
FIG. 3 is a graph showing a CAN bus signal over time, in accordance with an embodiment.

FIG. 3 shows an example of a CAN frame having the base frame format. As shown in this example, the data frame has: a start-of-frame field having one bit and denoting the start of frame transmission; an identifier field having 11 bits which identifies and indicates the message priority; a remote transmission request (RTR) field having 1 bit which is dominant (bit=0) for data frames and recessive (bit=1) for remote request frames; one identifier extension (IDE) field having one bit which is dominant (bit=0) for base frame format with 11-bit identifiers; a reserved bit (r0) field having 1 bit which must be dominant (bit=0) but accepted as either dominant or recessive; a data length code (DLC) field having 4 bits and which has a number of bytes of data (0-8 bytes); a vehicle data field having 0-64 bits (0-8 bytes) for communicating vehicle data; a cyclic redundancy check (CRC) field comprising 15 bits; a CRC delimiter field having one bit and which must be recessive (bit=1); an acknowledgement (ACK) slot field having 1 bit and which transmitter sends recessive (bit=1) and any receiver can assert a dominant (bit=0); an ACK identifier field having one bit which must be recessive (bit=1); and an end-of-frame field having 7 bits and which must be recessive (bit=1).

In this embodiment, upon receiving a series of frames, e.g., a CAN message, the computer 34 can determine the speed of the winter service vehicle 10 by reading the data field of a frame having an address corresponding to the speed of the winter service vehicle 10. For instance, the address corresponding to the speed of the winter service vehicle 10 can be the number "45". Accordingly, the computer 34 can determine the current speed of the winter service vehicle 10 by reading the data field of any frame having the number "45" as the address. Similarly, the computer 34 can also be configured to send a remote frame to the ECU 16 requesting the data frame having the number "45" as the address.

It will be understood that the expression "computer" as used herein is not to be interpreted in a limiting manner. It is rather used in a broad sense to generally refer to the combination of some form of one or more processing units and some form of memory system accessible by the processing unit(s). The computer 34 can be a microcontroller, a personal computer, a smart phone, an appliance computer, etc.

It will be understood that the various functions of the computer 34, or more specifically of the processing unit or of the memory controller, can be performed by hardware, by software, or by a combination of both. For example, hardware can include logic gates included as part of a silicon chip of the processor. Software can be in the form of data such as computer-readable instructions stored in the memory system. With respect to a computer, a processing unit, a memory controller, or a processor chip, the expression "configured to" relates to the presence of hardware, software, or a combination of hardware and software which is operable to perform the associated functions.

In some embodiments, the computer 34 is located in a cabin of the winter service vehicle 10 and is accessible to the driver. In these embodiments, the computer 34 has a user interface such as a touchscreen, a display, a keyboard, or a combination thereof allowing the driver to interact with the computer 34. The computer 34 can thus be configured to receive user input such as a desired amount of de-icing material per unit length to be spread on the road 20. In this case, the computer 34 can determine the spreading rate based on the current speed of the winter service vehicle in addition to the desired amount of per unit length to be spread on the road 20. In alternate embodiments, the computer 34 is in communication with a remote computer or server and receives the desired amount of de-icing material per unit length to be spread on the road from the remote computer or server.

As can be understood, the computer 34 can have a processor, a memory, and I/O interface and other electronic components. Instructions for operating the computer 34 can be stored on the memory and be accessible by the processor.

The processor can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface enables the computer 34 to interconnect with one or more input devices such as the ECU 16 or with one or more output devices such as the ECU 16.

Each network interface enables the computer 34 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 4:
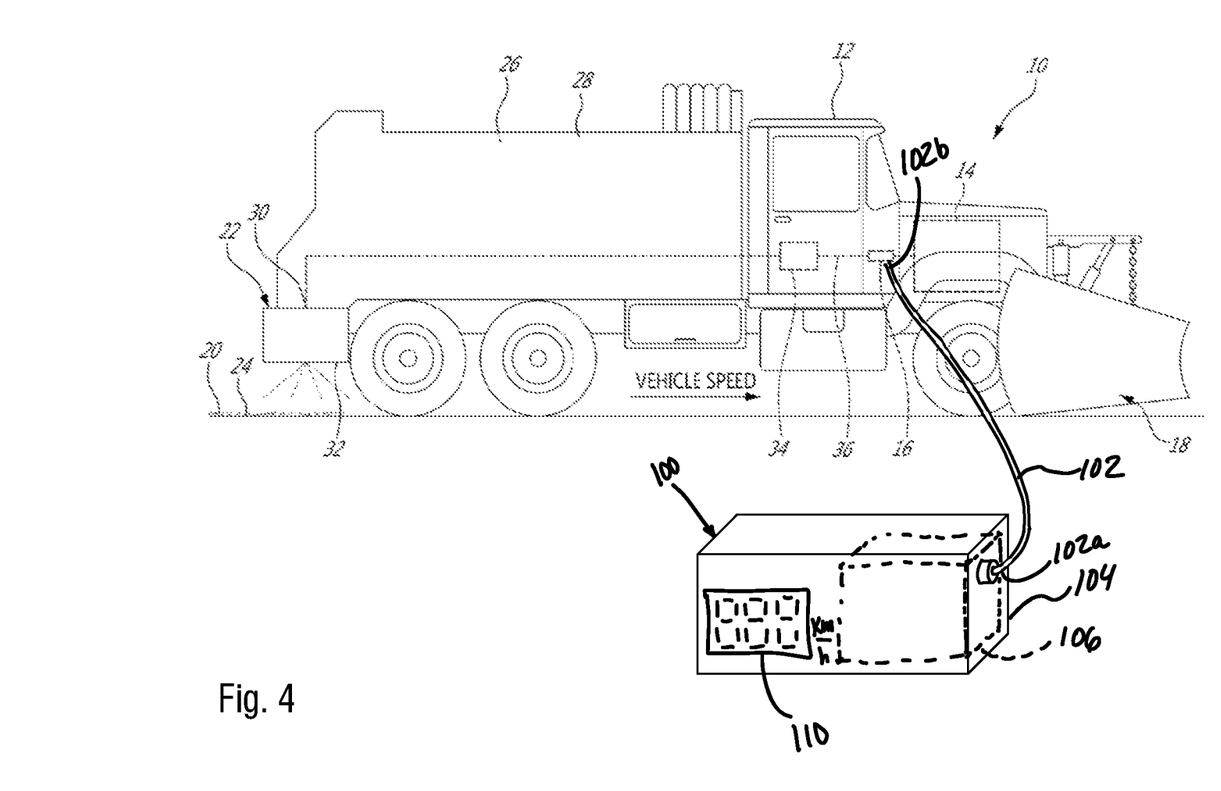
FIG. 4 is a schematic view of an example of a CAN message scanner, shown with a controller communicatively connected to the ECU of a winter service vehicle via a CAN bus link, in accordance with an embodiment.

FIG. 4 shows a CAN message scanner 100 for a winter service vehicle. For ease of reading, the CAN message scanner 100 will be described with reference to the winter service vehicle 10 of FIG. 1.

As will be appreciated, the CAN message scanner 100 can preferably be used during the installation of the spreading system 22 to the winter service vehicle 10. As described above, the spreading system 22 can spread de-icing material according to a spreading rate which varies as function of the current speed of the winter service vehicle 10. To determine the correct spread rate at all times, the computer 34 reads the current speed of the winter service vehicle 10 thanks to the CAN bus link 36 between the computer 34 and the ECU 16 of the winter service vehicle 10. However, when installing the spreading system 22, the computer 34 has to be programmed to read the correct vehicle data field, i.e., the data field corresponding to the current speed of the winter service vehicle 10, of the CAN message(s) received from the ECU, unless the right spreading rate may not be accurately determined.

During the installation, the CAN message scanner 100 can be used to retrieve, via a temporary CAN bus communication with the ECU 16, which vehicle data field carries information concerning a current speed of the winter service vehicle 10. The CAN message scanner 100 can then communicate the retrieved information to the computer 34 thereby allowing the computer 34 to accurately read the current speed of the winter service vehicle 10, regardless of the engine type or make, at any desired time. By doing so, use of highly trained technician(s) for the installation, as well as discussion(s) with the engine manufacturer(s) and/or operation/maintenance manual(s) scrutiny, can advantageously be reduced.

Still referring to FIG. 4, the CAN message scanner 100 has a housing 104, and a controller 106 inside the housing 104. During use, the CAN message scanner 100 is communicatively coupled to the ECU 16 of the winter service vehicle 10 via a CAN bus link 102. More specifically, in this example, the CAN bus link 102 has a proximal end 102a connected to the controller 106 and a distal end 102b connected to the ECU 16. Both the proximal and distal ends 102a, 102b of the CAN bus link 102 can be connected in a removable manner. However, in some other embodiments, the proximal end 102a of the CAN bus link 102 may be permanently connected to the controller 106 via wire bonding and the like.

In some embodiments, the controller 106 has a user interface 110 mounted to the housing 104. In this example, the user interface 110 is communicatively coupled to the controller 106 and is used to display a value carried by one or more vehicle data field(s) of the CAN message(s) received from the ECU 16. In some embodiments, the user interface 110 can receive user input and/or display information pertaining to the winter service vehicle 10.

Figure 5:
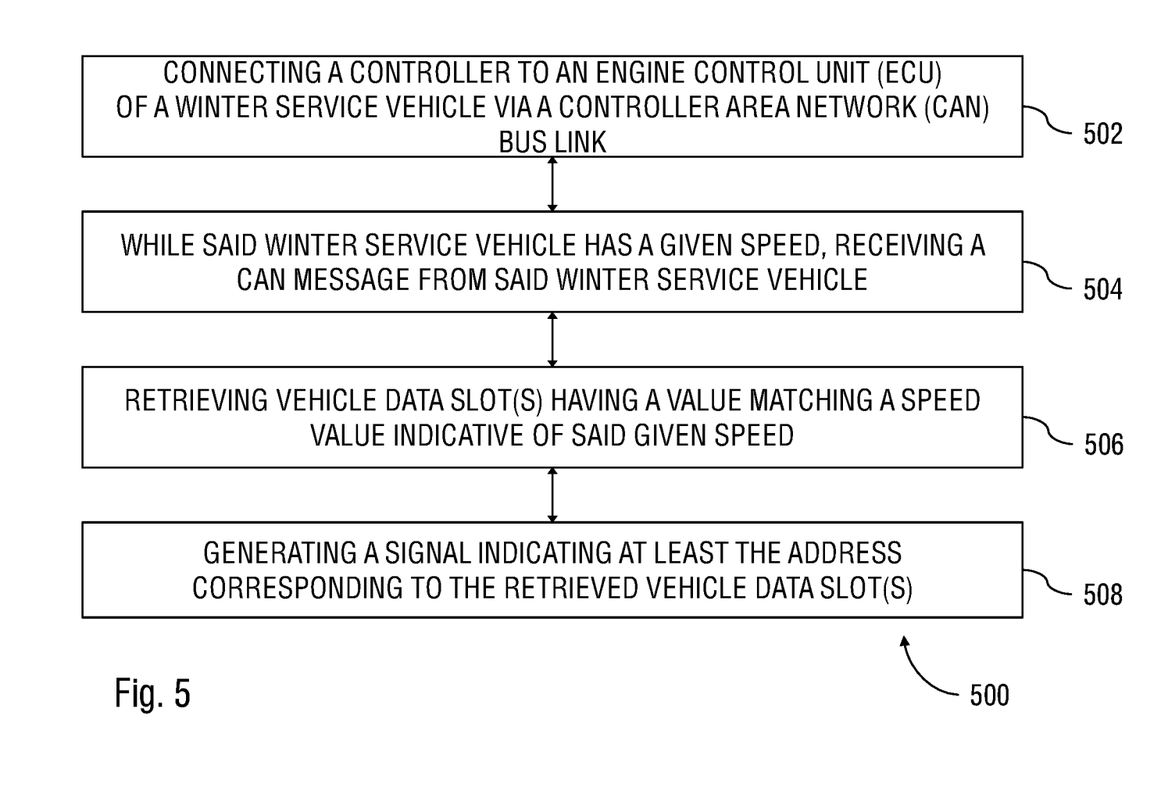
FIG. 5 is a flow chart of a method of scanning a CAN message received from the ECU of the winter service vehicle of FIG. 4, in accordance with an embodiment.

FIG. 5 shows an example flow chart of a method 500 of scanning a CAN message received from the winter service vehicle 10. The method 500 can be performed using the CAN message scanner 100, in some embodiments. For ease of reading, the method 500 will be described with reference to the winter service vehicle 10 of FIG. 1 as well as to the CAN message scanner 100.

As shown, the method 500 has a step 502 of communicatively connecting the controller 106 of the CAN message scanner 100 to the ECU 16 of the winter service vehicle 10 via the CAN bus link 102. In some embodiments, the step 502 can include a step of connecting the distal end 102b of the CAN bus link 102 to a diagnostic port of the ECU 16 of the winter service vehicle 10.

At step 504, the controller 106 receives at least a CAN message from the ECU 16 via the CAN bus link 102 while the winter service vehicle 10 has a given speed. As described above, the CAN message has a plurality of vehicle data fields located at corresponding addresses of the CAN message.

In some embodiments, the winter service vehicle 10 is accelerated on the road so as to reach the given speed. In such embodiments, the CAN message scanner 100 can be inside the cabin of the winter service vehicle as it receives the CAN message from the ECU. In some other embodiments, the winter service vehicle 10 has motorized wheels that are received on rotating rollers thereby allowing the motorized wheels to achieve a linear speed corresponding to the given speed while the winter service vehicle 10 remains stationary, for instance.

At step 506, the controller 106 retrieves, in the received CAN message, one or more vehicle data field(s) having a value matching a speed value indicative of the given speed of the winter service vehicle 10. Indeed, as at least a given one of the vehicle data fields of the received CAN message contains information concerning the current speed of the winter service vehicle 10, the value carried by the given one of the vehicle data fields will necessarily correspond to the given speed of the winter service vehicle 10 at the time the CAN message was issued or received.

At step 508, the controller 106 generates a signal indicating at least the address(es) corresponding to the retrieved vehicle data field(s).

Using the signal generated at step 508, the computer 34 of the winter service vehicle can be suitably instructed to read a current speed of the winter service vehicle 10 at the retrieved address(es) based on the signal generated at step 508. As such, the computer 34 can thereafter accurately determine the spreading rate of the de-icing material based on the current speed of the winter service vehicle as read from the CAN bus link 36.

It is intended that in some embodiments, at step 504, the winter service vehicle is accelerated in accordance with a given acceleration pattern having speed values associated to corresponding moments in time. An example of such an acceleration pattern can include [(v1, t1), (v2, t2), (v3, t3)]. In such an example, the step 504 can include receiving CAN messages over time, and especially at moments in time t1, t2 and t3 of the acceleration process. The controller 106 can scan the values of the vehicle data fields and retrieve the vehicle data field which value varies from v1 at moment in time t1, to v2 at moment in time t2, to v3 at moment in time t3, and so forth. In some other embodiments, once a vehicle data field has been retrieved, the controller 106 may confirm that the retrieved data field in fact corresponds to the current speed of the winter service vehicle 10 by comparing the evolution of the value of that vehicle data field against the known acceleration pattern.

Similarly to the computer 34, the controller 106 can be provided as a combination of hardware and software components. The hardware components can be implemented in the form of a computing device 600, an example of which is described with reference to FIG. 6. Moreover, the software components of the controller 106 can be implemented in the form of a software application 700, an example of which is described with reference to FIG. 7.

Figure 6:
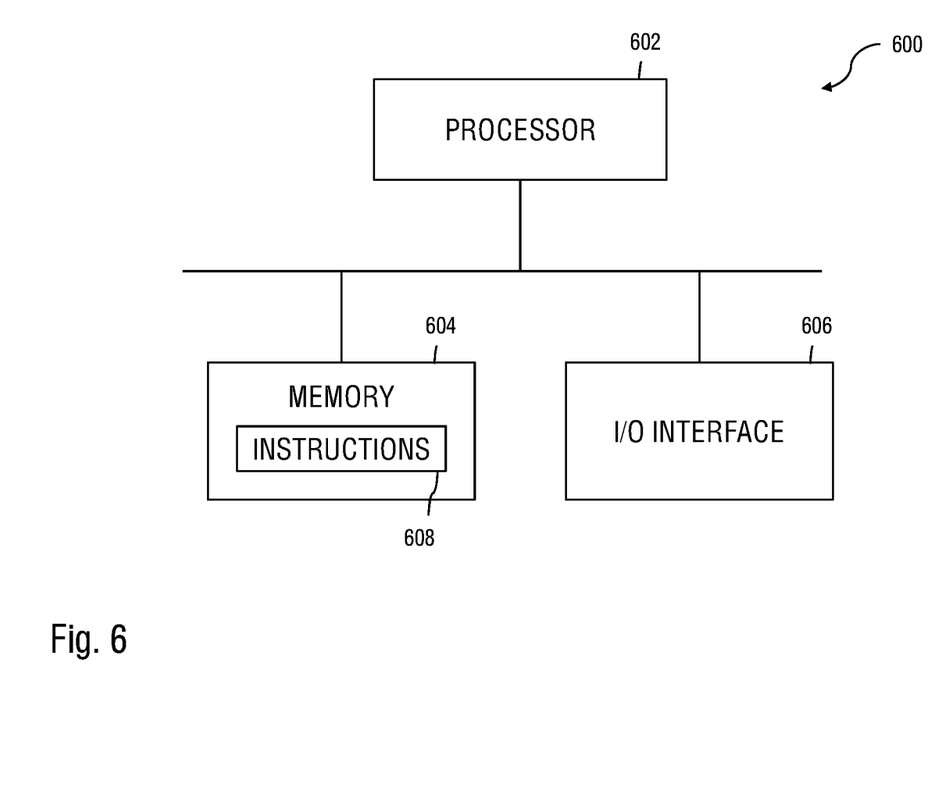
FIG. 6 is a schematic view of an example of a computing device of the controller of FIG. 4, in accordance with an embodiment.

Referring to FIG. 6, the computing device 600 can have a processor 602, a memory 604, and I/O interface 606. Instructions 608 for scanning CAN message(s) and retrieving vehicle speed information can be stored on the memory 604 and accessible by the processor 602.

The processor 602 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 604 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 606 enables the computing device 600 to interconnect with one or more input devices, such as mouse(s), keyboard(s), user interface(s), or with one or more output devices such as display(s), memory(ies), network(s).

Each I/O interface 606 enables the controller 106 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Figure 7:
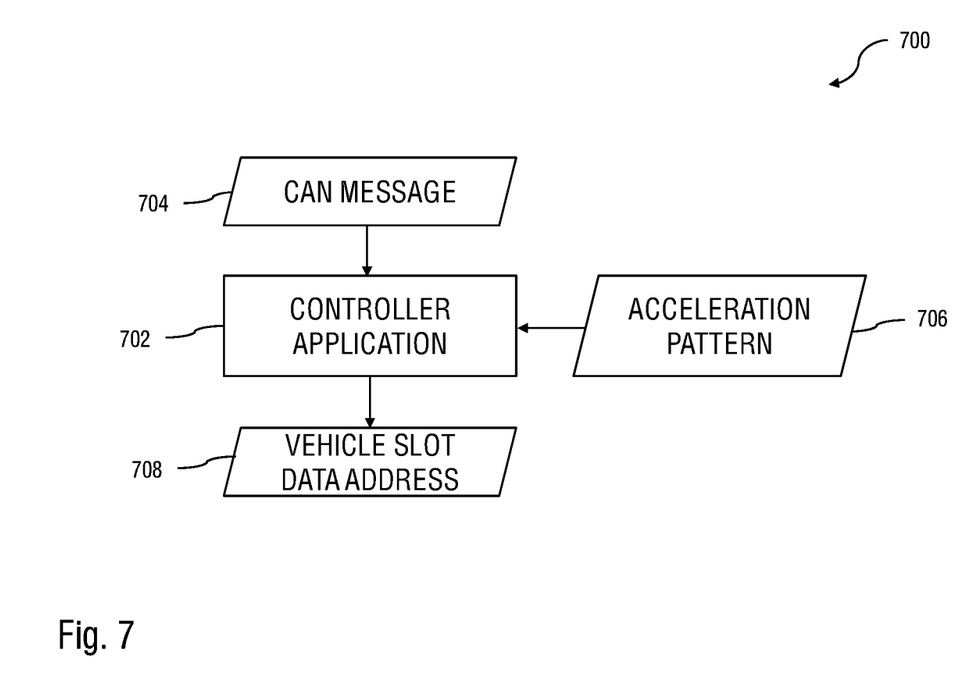
FIG. 7 is a schematic view of an example of a software application of the controller of FIG. 4, in accordance with an embodiment.

Referring now to FIG. 7, the software application 700 is configured to receive one or more CAN message(s) 704 indicative of vehicle information from the ECU of the winter service vehicle, and to retrieve CAN message address(es) 708 corresponding to vehicle data field carrying current speed information. In some embodiments, the software application 700 is stored on the memory 604 and accessible by the processor 602 of the computing device 600.

The computing device 600 and the software application 700 described above are meant to be examples only. Other suitable embodiments of the controller 106 can also be provided, as it will be apparent to the skilled reader.

As can be understood, the examples described above and illustrated are intended to be exemplary only. Although the illustrated embodiment shows a winter service vehicle having a truck chassis, it is understood that the winter service vehicle can have any other suitable type of chassis depending on the embodiment. For instance, the winter service vehicle can have a regular vehicle chassis in some embodiments or a dump truck chassis in some other embodiments. Although the winter service vehicle generally has a diesel engine, it is intended that the winter service vehicle can have an electric engine, a gasoline engine or any other suitable engine. The spreading system is not limited to the one described in this disclosure. Indeed, it is intended that the winter service vehicle can have any spreading system which spreading rate can be adjusted in real time or quasi real time. It will be understood that the CAN bus connection between the ECU and the computer can be a wired connection, a wireless connection or a combination of both depending on the circumstances. Moreover, as will be understood, the diagnostic CAN bus port of the ECU can be provided in the form of a J1939 port, a J1708 port or a CAN open port, depending on which type of communication protocol the ECU uses. The scope is indicated by the appended claims.

What is claimed is:

1. A controller area network (CAN) message scanner for a winter service vehicle, the CAN message scanner comprising:
   a housing;
   a controller inside said housing; and
   a CAN bus link having a proximal end connected to said controller and a distal end connected to a diagnostic port of an engine control unit (ECU) of said winter service vehicle;
   said controller having a processor and a memory having instructions stored thereon which when executed by said processor perform,
      while said winter service vehicle has a given speed, receiving a CAN message from said ECU vehicle via said CAN bus link, said CAN message having a plurality of vehicle data fields located at corresponding addresses of said CAN message;
      retrieving at least a vehicle data field having a value matching a speed value indicative of said given speed of said winter service vehicle; and
      generating a signal indicating at least an address corresponding to said retrieved vehicle data field.

2. The CAN message scanner of claim 1 wherein said moving comprises accelerating said winter service vehicle in accordance with a given acceleration pattern, said receiving comprising receiving a plurality of CAN messages over time during said accelerating, scanning said retrieved vehicle data field over said plurality of CAN messages, comparing values carried by said scanned vehicle data field to said given acceleration pattern, and generating a signal based on said comparison.

3. The CAN message scanner of claim 1 further comprising, upon connecting a spreading system to said ECU via CAN bus link communication, instructing said spreading system to read a current speed of said winter service vehicle at said retrieved address.

4. The CAN message scanner of claim 1 wherein said CAN bus link allows communication according to the SAE J1939 standard protocol.

5. The CAN message scanner of claim 1 wherein said CAN bus link allows communication according to the SAE J1708 standard protocol.

6. The CAN message scanner of claim 1 wherein said CAN bus link includes a wired CAN bus connection between a diagnostic CAN bus port of said ECU and said controller.

7. The CAN message scanner of claim 1 wherein said diagnostic CAN bus port is a J1939 port.

8. The CAN message scanner of claim 1 further comprising a user interface mounted to said housing and communicatively coupled to said controller, said user interface at least displaying a value carried by said retrieved vehicle data field.

9. A method of scanning a controller area network (CAN) message received from a winter service vehicle, said method comprising:

communicatively connecting a controller to an engine control unit (ECU) of said winter service vehicle via a CAN bus link;

said controller performing the steps of:

while said winter service vehicle moves at a given speed, receiving a CAN message from said ECU via said CAN bus link, said CAN message having a plurality of vehicle data fields located at corresponding addresses of said CAN message;

retrieving at least a vehicle data field having a value matching a speed value indicative of said given speed of said winter service vehicle; and generating a signal indicating at least an address corresponding to said retrieved vehicle data field.

10. The method of claim 9 wherein said moving comprises accelerating said winter service vehicle in accordance with a given acceleration pattern, said receiving comprising receiving a plurality of CAN messages over time during said accelerating, scanning said retrieved vehicle data field over said plurality of CAN messages, comparing values carried by said scanned vehicle data field to said given acceleration pattern, and generating a signal based on said comparison.

11. The method of claim 9 further comprising, upon connecting a spreading system to said ECU via CAN bus link communication, instructing said spreading system to read a current speed of said winter service vehicle at said retrieved address.

12. The method of claim 9 wherein said CAN bus link allows communication according to the SAE J1939 standard protocol.

13. The method of claim 9 wherein said CAN bus link allows communication according to the SAE J1708 standard protocol.

14. The method of claim 9 wherein said CAN bus link includes a wired CAN bus connection between a diagnostic CAN bus port of said ECU and said controller.

15. The method of claim 14 wherein said diagnostic CAN bus port is a J1939 port.

16. The method of claim 9 further comprising display a value associated to said retrieved vehicle data field.

* * * * *